United States Patent [19]
Nishimura et al.

[11] Patent Number: 4,618,188
[45] Date of Patent: Oct. 21, 1986

[54] HYDRAULIC ANTI-SKID APPARATUS FOR AUTOMOTIVE VEHICLES

[75] Inventors: Takumi Nishimura, Chiryu; Tadao Saito, Nagoya, both of Japan

[73] Assignees: Aisin Seiki Kabushiki Kaisha, Kariya; Toyota Jidosha Kabushiki Kaisha, Toyota, both of Japan

[21] Appl. No.: 765,124

[22] Filed: Aug. 13, 1985

[30] Foreign Application Priority Data

Aug. 13, 1984 [JP] Japan ............................... 59-169073

[51] Int. Cl.⁴ ............................................. B60T 8/10
[52] U.S. Cl. ..................................... 303/116; 303/111
[58] Field of Search ............... 188/181 A; 303/92, 93, 303/111, 113, 116, 117, 119

[56] References Cited

U.S. PATENT DOCUMENTS

| | | | |
|---|---|---|---|
| 3,722,960 | 3/1973 | Von Lowis of Menar | 303/116 |
| 3,922,021 | 11/1975 | Every | 303/92 |
| 4,453,782 | 6/1984 | Arikawa et al. | 303/116 |

*Primary Examiner*—Duane A. Reger
*Attorney, Agent, or Firm*—Oblon, Fisher, Spivak, McClelland & Maier

[57] ABSTRACT

A hydraulic anti-skid apparatus for use in a vehicle braking system comprises a cut-off valve disposed within a braking circuit connecting a master cylinder to a wheel brake cylinder, a bypass valve disposed within a bypass passage of the braking circuit, and first and second pistons respectively arranged to control opening and closing operations of the cut-off valve and the bypass valve. A main body for the anti-skid apparatus is formed with a single cylinder the one end of which is closed by a closure member fixed thereto. To simplify the anti-skid apparatus in construction, the cut-off valve and the bypass valve are coaxially arranged within the single cylinder to be controlled by the first and second pistons respectively.

8 Claims, 3 Drawing Figures

HYDRAULIC ANTI-SKID APPARATUS FOR AUTOMOTIVE VEHICLES

BACKGROUND OF THE INVENTION

The present invention relates to a hydraulic anti-skid apparatus for use in a vehicle braking system between a master cylinder and a wheel brake cylinder, and more particularly to a hydraulic anti-skid apparatus of the type which comprises a cut-off valve disposed within a braking circuit connecting the master cylinder to the wheel brake cylinder, a bypass valve disposed within a bypass passage of the braking circuit, and first and second pistons respectively arranged to control opening and closing operations of the cut-off valve and the bypass valve.

Such a conventional hydraulic anti-skid apparatus as described above has been proposed, for example, in the Japanese Patent Early Publication 58-199258, wherein a main body for the anti-skid apparatus is formed therein with two parallel cylinders respectively to contain the cut-off valve and the associated first piston and to contain the bypass valve and the associated second piston. In such a construction of the anti-skid apparatus, the component parts of the cut-off valve and the first piston are assembled within one of the cylinders the one end of which is closed by a closure member, and further the component parts of the bypass valve and the second piston are assembled within the other cylinder the one end of which is closed by another closure member. Furthermore, it is necessary to form a communication passage between the cylinders during the manufacturing process of the main body. For these reasons, the conventional anti-skid apparatus is large in size and complicated in construction, resulting in a decrease in its productivity.

SUMMARY OF THE INVENTION

It is, therefore, a primary object of the present invention to provide an improved hydraulic anti-skid apparatus wherein the cut-off valve and the bypass valve are coaxially arranged within a single cylinder to be controlled by the first and second pistons respectively.

According to the present invention, there is provided a hydraulic anti-skid apparatus which comprises a main body formed therein with a single cylinder the one end of which is closed by a closure member fixed thereto, the cylinder being provided with an inlet port for connection to a master cylinder and an outlet port for connection to a wheel brake cylinder, and wherein a cut-off valve and a bypass valve are coaxially arranged within the single cylinder to be controlled by first and second pistons respectively. The cut-off valve includes a valve seat arranged within the single cylinder to permit the flow of fluid between the inlet and outlet ports therethrough, and a valve element arranged to cooperate with the valve seat to block the flow of fluid from the inlet port to the outlet port when engaged with the valve seat. The first piston is axially slidably disposed within one end portion of the single cylinder to be applied at one end thereof with a braking pressure from the master cylinder through the valve seat and at the other end thereof with a hydraulic power pressure from a hydraulic power pressure source, the first piston being associated with the valve element to disengage the valve element from the valve seat while the hydraulic power pressure is applied thereto and to be displaced outwardly by the braking pressure when released from the hydraulic power pressure to effect engagement of the valve element with the valve seat and subsequently to increase a capacity downstream of the valve seat.

The bypass valve includes first and second valve seats arranged within the single cylinder coaxially with the valve seat of the cut-off valve and axially spaced to each other to form a valve chamber in open communication with the outlet port, the first valve seat forming a bypass passage between the inlet and outlet ports, and the second valve seat being in open communication with the valve seat of the cut-off valve to permit therethrough the flow of fluid from the valve seat of the cut-off valve to the valve chamber, a second valve element contained within the valve chamber to permit the flow of fluid passing through the second valve seat when engaged with the first valve seat and to permit the flow of fluid passing through the bypass passage when engaged with the second valve seat, and a spring interposed between the valve element of the cut-off valve and the second valve element through the first valve seat. The second piston is axially slidably disposed within the other end portion of the single cylinder to be applied at one end thereof with the braking pressure and at the other end thereof with hydraulic power pressure, the second piston being associated with the second valve element to maintain engagement of the second valve element with the first valve seat against the spring while the hydraulic power pressure is applied thereto and to effect engagement of the second valve element with the second valve seat when released from the hydraulic power pressure.

With the above arrangement of the anti-skid apparatus, the first piston, the component parts of the cut-off valve, the component parts of the bypass valve and the second piston can be assembled in series within the single cylinder. This serves to reduce the component parts of the anti-skid apparatus and to make the main body simple in construction and small in size. In the actual practices of the present invention, it is preferable that a compression spring is arranged within the single cylinder to bias the first piston toward the valve element of the cut-off valve. Alternatively, a compression spring may be arranged within the single cylinder to bias the second piston against the hydraulic power pressure. This serves to open the bypass valve before the cut-off valve is closed due to unexpected decrease of the hydraulic power pressure caused by trouble or damage of the hydraulic power pressure source, the power pressure circuit, and the like.

BRIEF DESCRIPTION OF THE DRAWINGS

Additional objects, features and advantages of the present invention will become readily apparent from the following detailed description of a preferred embodiment and modification thereof when taken together with the accompanying drawings, in which.

DETAILED DESCRIPTION OF THE PREFERRED EMBODIMENT

Figure 1:
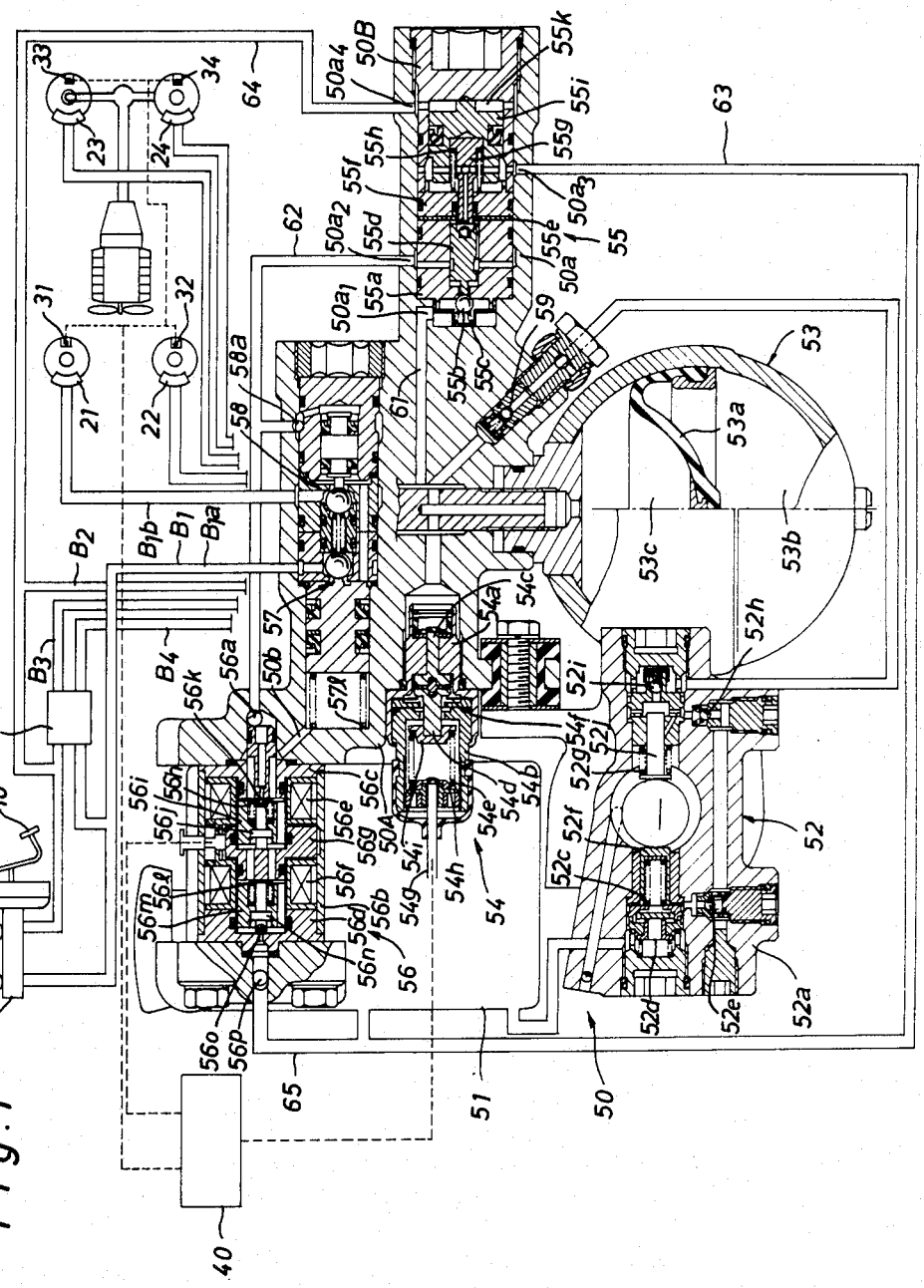
FIG. 1 is a sectional view illustrating a hydraulic anti-skid apparatus in accordance with the present invention.

Referring now to the drawings, particularly in FIG. 1, there is schematically illustrated a braking system for automotive vehicles which includes a tandem master cylinder 12 equipped with a booster 11 to be activated by depression of a brake pedal 10. The tandem master cylinder 12 has a front pressure chamber connected to a left-hand front wheel brake cylinder 21 by way of a hydraulic curcuit $B_1$ and connected to a right-hand rear wheel brake cylinder 24 by way of a bypass circuit $B_4$ of the hydraulic circuit $B_1$. The tandem master cylinder 12 has a rear pressure chamber connected to a right-hand front wheel brake cylinder 22 by way of a hydraulic circuit $B_2$ and connected to a left-hand rear wheel brake cylinder 23 by way of a bypass circuit $B_3$ of the hydraulic circuit $B_2$. Disposed within the hydraulic circuits $B_3$ and $B_4$ is a well known proportioning valve 19.

In the above-described arrangement of the hydraulic circuits, the braking system includes an anti-skid apparatus 50 for controlling the braking pressure respectively applied to the wheel brake cylinders 21, 22, 23 and 24. The anti-skid apparatus 50 comprises wheel lock sensors 31, 32, 33 and 34 for detecting the rotational speed of the respective road wheels, and a module 40 for producing an electric control signal therefrom in depedence upon each value of electric signals from the sensors. The anti-skid apparatus 50 further comprises a reservoir 51, a high pressure two-stage pump 52, an accumulator 53, a pressure switch 54, a changeover valve 55, a solenoid valve 56, a cut-off valve 57 of the piston type, and a bypass valve 58.

The solenoid valve 56, the cut-off valve 57 and the bypass valve 58 are arranged to control the fluid under pressure in the hydraulic circuit $B_1$. The hydraulic circuits $B_2$, $B_3$ and $B_4$ each are provided with a solenoid valve, a cut-off valve and a bypass valve (not shown) which are substantially the same in construction and operation as the solenoid valve 56, the cut-off valve 57 and the bypass valve 58. The reservoir 51 is arranged to store an amount of hydraulic fluid to be supplied to the accumulator 53. The high pressure two-state pump 52 is arranged to be driven by an electric motor (not shown) for producing a hydraulic power pressure. The high pressure two-stage pump 52 comprises a pump housing 52a, a cam shaft 52b rotatably carried on the pump housing 52a to be driven by the electric motor, a plunger 52f arranged to be reciprocated by engagement with the cam shaft 52b under load of a spring 52c, and a pair of check valves 52d and 52e arranged to cooperate with the plunger 52f for operating it as a low pressure pump. The two-stage pump 52 further comprises a plunger 52j arranged to be reciprocated by engagement with the cam shaft 52b under load of a spring 52g, and a pair of check valves 52h and 52i arranged to cooperate with the plunger 52j for operating it as a high pressure pump.

The accumulator 53 is of the gas type, the interior of which is subdivided by a diaphragm 53a into a gas pressure chamber 53b and a hydraulic pressure chamber 53c. The hydraulic pressure chamber 53c is connected to the two-stage pump 52 through a check valve 59 to store the hydraulic power pressure therein. The pressure switch 54 is arranged to detect the hydraulic pressure in chamber 53c of the accumulator 53. The pressure switch 54 comprises a body 54a of conductive material threaded into a main body 50A of conductive material for the anti-skid apparatus 50 in a liquid-tight manner, a body 54b of insulation material fixedly coupled within the body 54a, a plunger 54c arranged to be applied with the hydraulic pressure in chamber 53c of the accumulator 53, a movable contact member 54d connected to the plunger 54c through an insulation member, and a fixed contact member 54f arranged to be engaged with the movable contact member 54d. A leading wire 54g is arranged to be grounded through a retainer 54h, a spring 54e, a retainer 54i, the movable contact member 54d, the fixed contact member 54f and the body 54a. When the hydraulic pressure in chamber 53c of the accumulator 53 exceeds a predetermined level, the plunger 54c is displaced against the spring 54e to effect engagement of the movable contact member 54d with the fixed contact member 54f.

When the hydraulic pressure in chamber 53c of the accumulator 53 drops below the predetermined level, the spring 54e acts to disengage the movable contact member 54d from the fixed contact member 54f thereby to turn off the pressure switch 54. In this condition, the module 40 acts to activate a driving circuit of the electric motor. Thus, the high pressure two-stage pump 52 is driven by the electric motor to increase the hydraulic power pressure in chamber 53c of the accumulator 53. When the power pressure in chamber 53c increases up to the predetermined level, the movable contact member 54d is brought into engagement with the fixed contact member 54f to turn on the pressure switch 54, and in turn, the module 40 acts to deactivate the driving circuit for the electric motor upon lapse of a predetermined period of time. Thus, the hydaraulic power pressure in chamber 53c of the accumulator 53 is maintained substantially at the predetermined level which corresponds with a maximum braking pressure for causing lock of the road wheels in braking operation on a non-slippery road.

The changeover valve 55 is disposed within a power pressure circuit connecting the accumulator 53 to a port 56a of the solenoid valve 56 and to a port 58a of the bypass valve 58. The changeover valve 55 comprises a valve seat member 55a disposed within a cylinder 50a integral with the main body 50A, a ball valve 55b arranged to be engaged with a seat portion of member 55a, a compression spring 55c arranged to bias the ball valve 55b rightward, a valve spool 55d axially slidable in the valve seat member 55a and being provided at its left end with an axial projection in engagement with the ball valve 55b and at its right end with a ball, a stopper plate 55e fitted to the right end of valve seat member 55a, a holder 55f fitted to the right end surface of stopper plate 55e, a spool 55g axially slidably carried on the holder 55f and being formed at its left end with a seat portion to be engaged with the ball of valve spool 55d, a closure plug 50B threaded into the outer end of cylinder 50a, and a piston 55i axially slidably disposed within a bore in closure plug 50B, and a compression spring 55h arranged to bias the spool 55g and piston 55i rightward. The cylinder 50a is formed with a port $50a_1$ connected to the accumulator 53 through a passage 61, a port $50a_2$ connected through a power pressure conduit 62 to the port 56a of solenoid valve 56 and the port 58a of bypass valve 58, a port $50a_3$ connected through an exhaust conduit 63 to the reservoir 51, and a port $50a_4$ connected through a conduit 64 to the master cylinder 12. The port $50a_2$ is further connected to respective ports of the solenoid valves and the bypass valves for the hydraulic circuits $B_2$, $B_3$ and $B_4$ by way of a bypass conduit (not shown) in connection to the power pressure conduit 62.

When a chamber 55k in the changeover valve 55 is applied with a hydraulic pressure lower than a predetermined value through the port $50a_4$, the ball valve 55b is maintained in engagement with the seat portion of valve seat member 55a under the load of spring 55c to interrupt the communication between the ports $50a_1$ and $50a_2$, and the left end of spool 55g is disengaged from the ball of valve spool 55d under the load of spring 55h to permit the fluid communication between the ports $50a_2$ and $50a_3$ through radial holes in the valve seat member 55a, axial and radial recesses formed in the outer periphery and right end of the valve spool 55d, axial and radial holes in the spool 55g, and the port $50a_3$. When the chamber 55k in the changeover valve 55 is applied with a hydraulic pressure higher than the predetermined value through the port $50a_4$, the piston 55i and spool 55g are moved by the hydraulic pressure against the load of spring 55h to engage the seat portion of spool 55g with the ball of valve spool 55d and to disengage the ball valve 55b from the seat portion of member 55a against the load of spring 55c. Thus, the power pressure conduit 62 is disconnected from the exhaust conduit 63 and applied with the hydraulic power pressure from the accumulator 53 through the communication passage 61 and the ports $50a_1$ and $50a_2$. When the pressure in chamber 55k drops below the predetermined value, the hydraulic power pressure in conduit 62 acts to move the spool 55g and piston 55i rightward, and in turn, the spool 55g disengages from the ball of valve spool 55d under the load of spring 55h to permit the flow of fluid from the power pressure conduit 62 to the exhaust conduit 63. The pressure applied to the chamber 55k is determined to be relatively low pressure sufficient for effecting the fluid communication between conduits 61 and 62 in braking operation.

The solenoid valve 56 is energized under control of the module 40 to control the hydraulic power pressure applied to the cut-off valve 57 through the power pressure conduit 62. The solenoid valve 56 comprises a cylindrical casing 56b, a pair of axially spaced stationary cores 56c and 56d fixedly coupled with the opposite ends of casing 56b, a pair of axially spaced solenoid windings 56e and 56f wound around a pair of axially spaced bobbins, an annular block 56g interposed between the solenoid windings 56e and 56f, a movable core 56i axially slidably disposed within the bobbin for solenoid winding 56e and being biased leftward by a compression spring 56h to be attracted rightward in energization of the solenoid winding 56e, a valve support element 56j fixedly coupled within the movable core 56i, a ball valve 56k secured to the right end of valve support element 56j, a movable core 56m axially slidably disposed within the bobbin for solenoid winding 56f and being biased leftward by a compression spring 56l to be attracted rightward in energization of the solenoid winding 56f, a valve support element 56n fixedly coupled within the movable core 56m, and a ball valve 56o secured to the left end of valve support element 56n.

When both the solenoid windings 56e, 56f are being deenergized, the ball valve 56k is disengaged from a seat portion of the stationary core 56c under the load of spring 56h, while the ball valve 56o is maintained in engagement with a seat portion of the stationary core 56d under the load of spring 56l. In such a condition, the port 56a of solenoid valve 56 is communicated with a passage 50b in main body 50A through the seat portion of stationary core 56c and blocked from an exhaust port 56p in communication with the reservoir 51 through a passage 65. When both the solenoid windings 56e, 56f are energized, the movable core 56i is attracted rightward against spring 56h to cause engagement of the ball valve 56k with the seat portion of stationary core 56c, while the movable core 56m is attracted rightward against spring 56l to disengage the ball valve 56o from the seat portion of stationary core 55d. Thus, the passage 50b is blocked from the inlet port 56a of solenoid valve 56 and is communicated with the exhaust port 56p through an axial recess in movable core 56i, axial holes in annular block 56g, an axial recess in movable core 56m, and an orifice in stationary core 56d.

Figure 2:
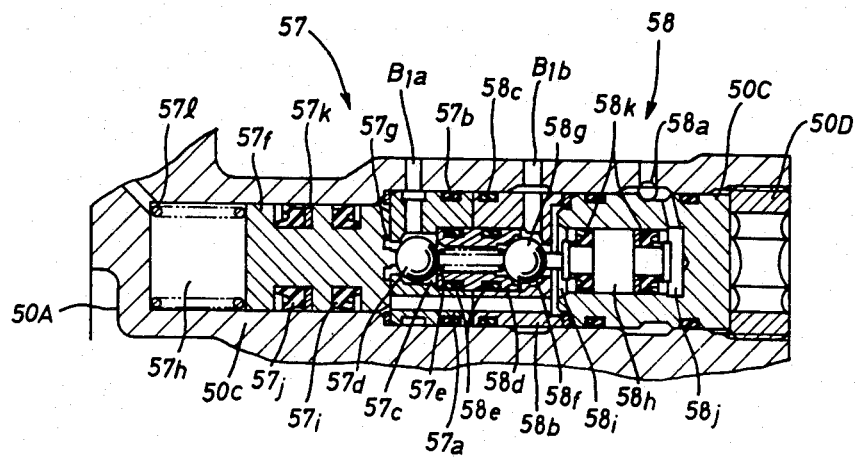
FIG. 2 is an enlarged sectional view of a cut-off valve and a bypass valve assembled within the anti-skid apparatus shown in FIG. 1.

As shown in FIG. 2, the cut-off valve 57 is associated with the bypass valve 58 coaxially within a single cylinder 50c which is integral with the main body 50A and is closed by a closure plug 50G fastened in place by a nut 50D with a hexagon socket. The cut-off valve 57 comprises a valve seat member 57a fixedly coupled within the cylinder 50c through an annular seal member 57b to form a valve chamber 57c, and a ball valve 57d contained within the valve chamber 57c. A first piston 57f is axially slidably disposed within the left end portion of cylinder 50c to form a braking pressure chamber 57g and a power pressure chamber 57h and is biased by a compression coil spring 57l toward a seat portion of valve seat member 57a. The piston 57f is provided in its outer circumference with a pair of axially spaced annular cup seal members 57i and 57j, and a back-up ring 57k. The bypass valve 58 comprises a valve seat member 58b fixedly coupled within the cylinder 58c through an annular seal member 58c and fitted to the valve seat member 57a to form a valve chamber 58f, a ball valve 58g contained within the valve chamber 58f, a tubular valve seat member 58d fixedly coupled within the valve seat members 57a and 58b through a pair of axially spaced annular seal members 58e, 58e, and a compression coil spring 57e contained within the tubular valve seat member 58d and being engaged at the opposite ends thereof with the ball valves 57d and 58g. A second piston 58h is axially slidably disposed within an axial bore in the closure plug 50C through a pair of axially spaced annular seal members 58k, 58k to form a braking pressure chamber 58i and a power pressure chamber 58j. In the assembly of cut-off valve 57 and bypass valve 58, the valve chamber 57c is connected to a first part $B_{1a}$ of the hydraulic circuit $B_1$ in connection to the tandem master cylinder 12, the valve chamber 58f is connected to a second part $B_{1b}$ of the hydraulic circuit $B_1$ in connection to the wheel cylinder 21, and the power pressure chamber 58j is connected to the power pressure conduit 62 through port 58a.

When the power pressure chamber 57h of cut-off valve 57 is applied with the power pressure from accumulator 53 by way of the changeover valve 55, conduit 62, solenoid valve 56 and passage 50b, the first piston 57f is urged rightward under the load of spring 57l to disengage the ball valve 57d from the seat portion of member 57a, and the second piston 58h is urged leftward by the hydraulic power pressure applied thereto in chamber 58j to engage the ball valve 58g with a seat portion of the tubular seat member 58d against the compression coil spring 57e. In such a condition, the valve chamber 57c is communicated with the valve chamber 58f through the braking pressure chamber 57g, axial holes in valve seat members 57a and 58b, and the braking pressure chamber 58*i* to permit the flow of pressurized fluid therethrough between the first and second parts of the hydraulic circuit $B_1$, and the first piston 57*f* is maintained in engagement with the left end of valve seat member 57*a* to minimize the capacity of braking pressure chamber 57*g*.

When the solenoid valve 56 is energized to connect the power pressure chamber 57*h* to the reservoir 51 therethrough, the piston 57*f* is moved leftward against the load of spring 57*l* by a braking pressure applied thereto in chamber 57*g*, and in turn, the ball valve 57*d* engages the seat portion of member 57*a* to block the fluid communication between the valve chamber 57*c* and the braking pressure chamber 57*g*. Thus, the first part $B_{1a}$ of hydraulic circuit $B_1$ is blocked from the second part $B_{1b}$ of hydraulic circuit $B_1$, and subsequently the capacity of braking pressure chamber 57*g* is increased by the leftward movement of piston 57*f* to decrease the braking pressure applied to the wheel brake cylinder 21.

If the power pressure from accumulator 53 drops below the predetermined value due to damage of the pump 52, the conduit 62 or the like in a condition where the cut-off valve 57 is opened, the compression spring 57*l* will act to restrict leftward movement of the first piston 57*f* caused by the braking pressure in chamber 57*g*, while the second piston 58*h* will be moved rightward by the difference in pressure between chambers 58*i* and 58*j* prior to engagement of the ball valve 57*d* with the seat portion of member 57*a*. Thus, the ball valve 58*g* is disengaged from the seat portion of tubular seat member 58*d* to permit a bypass flow of pressurized fluid across the tubular seat member 58*d* between the valve chambers 57*c* and 58*f*. In such a condition, the ball valve 57*d* is engaged with the seat portion of member 57*a* to close the braking pressure chamber 57*g*, while the ball valve 58*g* is engaged with a seat portion of member 58*b* to close the braking pressure chamber 58*i*. As a result, the braking operation is reliably effected without causing any increase in depression stroke of the brake pedal 10.

The module 40 is responsive to the electric signals from the wheel lock sensors 31, 32, 33 and 34 to detect the rotation of the respective road wheels in braking operation. When the left-hand front road wheel tends to be locked in the braking operation, the solenoid valve 56 is energized by an electric control signal from the module 40 to exhaust the power pressure from the chamber 57*h* of cut-off valve 57 into the reservoir 51. Thus, the cut-off valve 57 acts to block the communication between the first and second parts of hydraulic circuit $B_1$ so as to decrease the braking pressure in the wheel brake cylinder 21. When the road wheel is released from the tendency to be locked, the solenoid valve 56 is deenergized under control of the module 40 such that the chamber 57*h* of cut-off valve 57 is applied with the hydraulic power pressure from the conduit 62 to permit the flow of pressurized fluid between the first and second parts of hydraulic circuit $B_1$ thereby to increase the braking pressure in the wheel brake cylinder 21. Subsequently, the solenoid valve 56 is alternatively energized and deenergized under control of the module 40 to control the braking pressure in the wheel brake cylinder 21 so as to prevent the road wheel from locking during braking.

In such braking operation as described above, the changeover valve 55 acts to connect the power pressure conduit 62 to the accumulator 53 through the passage 61 when applied with the braking pressure from master cylinder 12 in depression of the brake pedal 10. When the braking pressure drops below the predetermined value in response to release of the brake pedal 10, the changeover valve 55 acts to disconnect the power pressure conduit 62 from the accumulator 53 and connect it to the reservoir 51 through the exhaust conduit 63. Thus, the pressure in chamber 57*h* of cut-off valve 57 and in chamber 58*j* in bypass valve 58 is exhausted while the brake pedal 10 is released. As a result, it is able to decrease the hydraulic load acting on all the sealing members in the assembly of cut-off valve 57 and bypass valve 58 so as to enhance the durability of them. Furthermore, the first piston 57*f* is urged by the load of spring 57*l* to open the cut-off valve 57 while the brake pedal 10 is released. This means that when the conduit 62 is applied with the hydraulic power pressure in response to operation of the changeover valve 55 caused by depression of the brake pedal 10, the cut-off valve 57 is conditioned to control the braking pressure without causing any shocks and noises.

Figure 3:
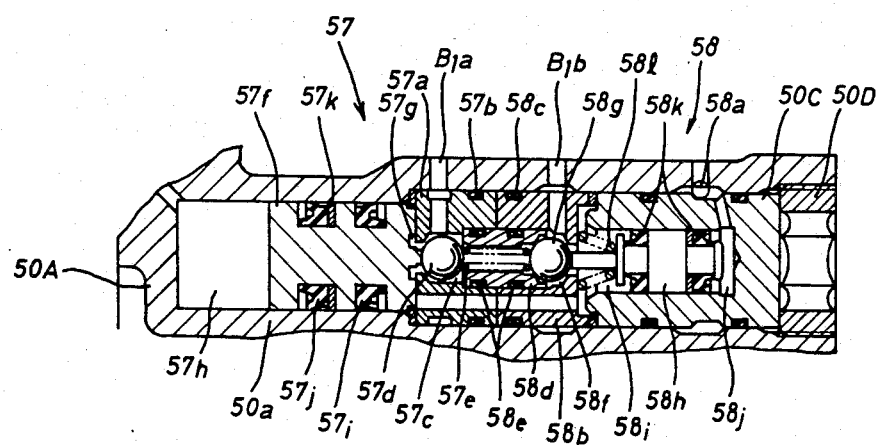
FIG. 3 is a sectional view of a modification of the cut-off valve and the bypass valve.

In FIG. 3 there is illustrated a modification of the assembly of cut-off valve 57 and bypass valve 58, wherein a compression spring 58*l* is engaged at one end thereof with the valve seat member 58*b* to bias the second piston 58*h* against the hydraulic power pressure in chamber 58*j*. In this modification, if the hydraulic power pressure from accumulator 53 drops below the predetermined value due to trouble or damage of the pump 52, the conduit 62 or the like, the compression spring 58*l* will act to effect rightward movement of the second piston 58*h* so as to open the bypass valve 58 before the cut-off valve 57 is closed.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A hydraulic anti-skid apparatus for installation in a vehicle braking system between a master cylinder and a wheel brake cylinder, comprising:

a main body formed therein with a single cylinder the one end of which is closed by a closure member fixed thereto, said cylinder being provided with an inlet port for connection to said master cylinder and an outlet port for connection to said wheel brake cylinder;

a cut-off valve including a valve seat arranged within said cylinder to permit the flow of fluid between said inlet and outlet ports therethrough, and a valve element arranged to cooperate with said valve seat to block the flow of fluid from said inlet port to said outlet port when engaged with said valve seat;

a first piston axially slidably disposed within one end portion of said cylinder to be applied at one end thereof with a braking pressure from said master cylinder through said valve seat and at the other end thereof with a hydraulic power pressure from a power pressure source, said first piston being associated with said valve element to disengage said valve element from said valve seat while the hydraulic power pressure is applied thereto and to be displaced outwardly by the braking pressure when released from the hydraulic power pressure to effect engagement of said valve element with said valve seat and subsequently to increase a capacity downstream of said valve seat;

a bypass valve including first and second valve seats arranged within said cylinder coaxially with the valve seat of said cut-off valve and axially spaced to each other to form a valve chamber in open communication with said outlet port, said first valve seat forming a bypass passage between said inlet and outlet ports, and said second valve seat being in communication with the valve seat of said cut-off valve to permit therethrough the flow of fluid from the valve seat of said cut-off valve to said valve chamber, a second valve element contained within said valve chamber to permit the flow of fluid passing through said second valve seat when engaged with said first valve seat and to permit the flow of fluid passing through said bypass passage when engaged with said second valve seat, and a spring interposed between said valve element of said cut-off valve and said second valve element; and a second piston axially slidably disposed within the other end portion of said cylinder to be applied at one end thereof with the braking pressure and at the other end thereof with the hydraulic power pressure, said second piston being associated with said second valve element to maintain engagement of said second valve element with said first valve seat against said spring while the hydraulic power pressure is applied thereto and to effect engagement of said second valve element with said second valve seat when released from the hydraulic power pressure.

2. A hydraulic anti-skid apparatus as claimed in claim 1, wherein a compression spring is arranged within said cylinder to bias said first piston toward the valve element of said cut-off valve.

3. A hydraulic anti-skid apparatus as claimed in claim 1, wherein a compression spring is arranged within said cylinder to bias said second piston against the hydraulic power pressure applied thereto.

4. A hydraulic anti-skid apparatus as claimed in claim 1, wherein a changeover valve is mounted on said main body and connected to said cut-off valve to normally permit therethrough the hydraulic power pressure applied to said first piston and to exhaust the hydraulic power pressure acting on said first piston when a road wheel tends to be locked in braking operation.

5. A hydraulic anti-skid apparatus as claimed in claim 1, wherein said cut-off valve comprises a first valve seat member fixedly coupled within said cylinder to form a first valve chamber in open communication with said inlet port, said first valve seat member being formed at one end thereof with a valve seat which is arranged to permit therethrough the flow of fluid between said inlet and outlet ports, a first valve element contained within said first valve chamber to cooperate with said valve seat to block the flow of fluid from said inlet port to said outlet port when engaged with said valve seat, said first piston being associated with said first valve element to disengage said first valve element from said valve seat while the hydraulic power pressure is applied thereto and to effect engagement of said first valve element with said valve seat when released from the hydraulic power pressure, and wherein said bypass valve comprises a second valve seat member fixedly coupled within said cylinder and fitted to said first valve seat member to form a second valve chamber in open communication with said outlet port, said second valve seat member being formed at one end thereof with a valve seat which is arranged to permit the flow of fluid from said first valve chamber to said second valve chamber through a communication passage formed in said first and second valve seat members, a tubular valve seat member fixedly coupled within said first and second valve seat members to form a bypass passage between said inlet and outlet ports, said tubular valve seat member being formed at one end thereof with a valve seat exposed to said second valve chamber, a second valve element contained within said second valve chamber to permit the flow of fluid passing through the valve seat of said second valve seat member when engaged with the valve seat of said tubular valve seat member and to permit the flow of fluid passing through said bypass passage when engaged with the valve seat of said second valve seat member, and a coil spring disposed within said tubular valve seat member and engaged at one end thereof with said first valve element and at the other end thereof with said second valve element.

6. A hydraulic anti-skid apparatus as claimed in claim 5, wherein a compression spring is arranged within said cylinder to bias said first piston toward the valve seat of said first valve seat member.

7. A hydraulic anti-skid apparatus as claimed in claim 5, wherein a compression spring is arranged within said cylinder to bias said second piston against the hydraulic power pressure applied thereto.

8. A hydraulic anti-skid apparatus as claimed in claim 5, wherein said second piston is axially slidably disposed within an axial bore in said closure member, and a compression coil spring is engaged at one end thereof with said second valve seat member to bias said second piston against the hydraulic power pressure,

* * * * *